US009901884B2

(12) United States Patent
Carroll et al.

(10) Patent No.: US 9,901,884 B2
(45) Date of Patent: Feb. 27, 2018

(54) METHOD AND APPARATUS FOR DISPENSING SOLID PRODUCT

(71) Applicant: Ecolab USA Inc., St. Paul, MN (US)

(72) Inventors: R. Ryan S. Carroll, Blaine, MN (US); Henry L. Carbone, II, St. Paul, MN (US); Charles E. Wensman, Minneapolis, MN (US); Bruce W. White, Hugo, MN (US); John D. Morey, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/180,987

(22) Filed: Jun. 13, 2016

(65) Prior Publication Data

US 2016/0325240 A1 Nov. 10, 2016

Related U.S. Application Data

(62) Division of application No. 12/715,911, filed on Mar. 2, 2010, now abandoned.

(Continued)

(51) Int. Cl.
*B05B 3/04* (2006.01)
*B08B 3/04* (2006.01)
(Continued)

(52) U.S. Cl.
CPC .............. *B01F 1/0033* (2013.01); *B05B 7/26* (2013.01); *B05B 12/081* (2013.01)

(58) Field of Classification Search
CPC ..................................................... C02F 1/5281
(Continued)

(56) References Cited

U.S. PATENT DOCUMENTS 2,820,701 A 1/1958 Leslie
3,595,438 A 7/1971 Daley et al.
(Continued)

FOREIGN PATENT DOCUMENTS

CN 1787873 A 6/2006
DE 4336339 4/1995
(Continued)

OTHER PUBLICATIONS

International Patent Application No. PCU/IB2010/050927, Written Opinion dated Nov. 22, 2010, 3 pages.

(Continued)

*Primary Examiner* — Monzer R Chorbaji
(74) *Attorney, Agent, or Firm* — Fredrikson & Bryon, P.A.

(57) ABSTRACT

A dispensing system includes a dispenser, a logic device, a nozzle, a diluent source, and a solid product. The logic device controls spray on and spray off cycles to pulse diluent supplied to the nozzle. The diluent contacts the solid product to dissolve a portion of the solid product and create a use solution. Pulsing the spray of diluent controls the concentration of the dispensed product in the use solution by limiting the amount of excess dilutant added to the dispensed product. The product is more consistently dispensed and the concentration of the dispensed product in the use solution is more consistent. Additionally, the concentration of the dispensed product in the use solution can be controlled by changing at least one of a volume of diluent dispensed through the nozzle, a pressure of diluent, a pulsed diluent spray frequency, and a pulsed diluent spray duration.

20 Claims, 13 Drawing Sheets

Related U.S. Application Data

(60) Provisional application No. 61/156,962, filed on Mar. 3, 2009.

(51) Int. Cl.

| | |
|---|---|
| ***B08B 3/00*** | (2006.01) |
| ***G07F 11/72*** | (2006.01) |
| ***B01D 11/02*** | (2006.01) |
| ***B67D 5/00*** | (2006.01) |
| ***B01F 1/00*** | (2006.01) |
| ***B05B 7/26*** | (2006.01) |
| ***B05B 12/08*** | (2006.01) |

(58) Field of Classification Search

USPC ............. 422/261, 292, 300; 134/93; 221/30; 222/80, 189, 320; 239/222; 210/754, 210/756

See application file for complete search history.

(56) References Cited

U.S. PATENT DOCUMENTS

| | | | |
|---|---|---|---|
| 3,831,205 A | | 8/1974 | Foley |
| 4,250,911 A | | 2/1981 | Kratz |
| 4,291,763 A | | 9/1981 | Singer |
| 4,407,779 A | | 10/1983 | Thompson |
| 4,426,362 A | | 1/1984 | Copeland et al. |
| 4,462,511 A | | 7/1984 | Fulmer et al. |
| 4,569,781 A | | 2/1986 | Fernholz et al. |
| 4,687,121 A | | 8/1987 | Copeland |
| 4,690,305 A | | 9/1987 | Copeland |
| 4,826,661 A | | 5/1989 | Copeland et al. |
| 4,830,509 A | | 5/1989 | Gulmatico, Jr. |
| 4,964,185 A | | 10/1990 | Lehn |
| 4,999,124 A | | 3/1991 | Copeland |
| 5,016,790 A | | 5/1991 | Thomas et al. |
| 5,100,032 A | | 3/1992 | Burdorf et al. |
| 5,137,694 A | | 8/1992 | Copeland et al. |
| 5,147,615 A | | 9/1992 | Bird et al. |
| 5,183,206 A | | 2/1993 | Gavin |
| 5,229,084 A | | 7/1993 | Livingston et al. |
| 5,234,615 A | | 8/1993 | Gladfelter et al. |
| 5,268,153 A | | 12/1993 | Muller |
| 5,310,430 A | | 5/1994 | McCall, Jr. |
| 5,342,587 A | | 8/1994 | Laughlin et al. |
| 5,374,119 A | | 12/1994 | Scheimann |
| 5,384,102 A | | 1/1995 | Ferguson et al. |
| 5,413,280 A | | 5/1995 | Taylor |
| 5,417,233 A | | 5/1995 | Thomas et al. |
| 5,427,748 A | | 6/1995 | Wiedrich et al. |
| 5,505,915 A | | 4/1996 | Copeland et al. |
| 5,536,479 A | | 7/1996 | Miller et al. |
| 5,539,669 A | | 7/1996 | Goeckner et al. |
| 5,607,651 A | | 3/1997 | Thomas et al. |
| 5,638,285 A | | 6/1997 | Newton |
| 5,849,253 A | | 12/1998 | Crossdale et al. |
| 5,928,608 A | * | 7/1999 | Levesque .............. B01F 1/0033 210/205 |
| 6,143,257 A | | 11/2000 | Spriggs et al. |
| 6,254,267 B1 | | 7/2001 | Arnaud |
| 6,517,727 B2 | | 2/2003 | Pickens et al. |
| 6,531,056 B2 | | 3/2003 | Hammonds |
| 7,081,232 B1 | | 7/2006 | Dooley, Jr. et al. |
| 7,228,066 B2 | | 6/2007 | Pope |
| 7,300,196 B2 | | 11/2007 | Fleig |
| 7,351,386 B2 | | 4/2008 | Halstead et al. |
| 7,452,122 B2 | | 11/2008 | Lin |
| 2005/0129596 A1 | | 6/2005 | Barani |
| 2005/0150489 A1 | | 7/2005 | Dunfield et al. |
| 2005/0244315 A1 | | 11/2005 | Greaves et al. |
| 2007/0170102 A1 | | 7/2007 | Barani |
| 2008/0035765 A1 | | 2/2008 | Kubby et al. |
| 2008/0152556 A1 | | 6/2008 | Brandreth |

FOREIGN PATENT DOCUMENTS

| | | |
|---|---|---|
| WO | WO 1991/07907 | 6/1991 |
| WO | WO 2008/115203 A1 | 9/2008 |
| WO | WO 2009/106476 A1 | 9/2009 |
| WO | WO 2010/100617 A2 | 9/2010 |

OTHER PUBLICATIONS

European Patent Application No. 10748407.3, Extended European Search Report and Written Opinion dated Jul. 24, 013, 7 pages.

International Search Report for PCT/IB2010/050927 dated Nov. 22, 2010.

* cited by examiner

Prototype Asepti Solids Dispenser Wiring Diagram for Field Test Units

Plot of Spray Time and Delay Time

METHOD AND APPARATUS FOR DISPENSING SOLID PRODUCT

This application claims priority to and benefit of U.S. application Ser. No. 12/715,911, filed on Mar. 2, 2010 and U.S. Provisional Application No. 61/156,962, filed Mar. 3, 2009, both of which are entitled METHOD AND APPARATUS FOR DISPENSING SOLID PRODUCT and both of which are incorporated in their entirety herein by reference.

FIELD OF THE INVENTION

The present invention relates to a method and an apparatus for dispensing a solid product.

BACKGROUND

A solid product is commonly converted into a concentrated solution or a use solution by dissolving at least a portion of the solid product by impingement of a diluent, such as water, upon the solid product. Examples of such solid products include pre-rinse products, enzymes, detergents, rinse aids, and other products. Maintaining the required or desired concentration of the resulting concentrated solution or use solution over several cycles can be a challenge.

For the reasons stated above and for other reasons stated below, which will become apparent to those skilled in the art upon reading and understanding the present specification, there is a need in the art for a method and apparatus for dispensing solid products consistently to maintain required or desired concentrations of the resulting concentrated solution or use solution over several cycles.

SUMMARY

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a dispensing system comprises a dispenser including a cavity and a nozzle, a solid product positioned within the cavity, a diluent source in fluid communication with the dispenser supplying a diluent to the nozzle, and a logic device controlling spray on and spray off cycles to pulse the diluent supplied to the nozzle as a pulsed diluent spray during a product dispensing process. The diluent contacts a surface of the solid product to dissolve at least a portion of the solid product and create a use solution. The pulsed diluent spray increases the concentration of the dissolved solid product in the use solution by limiting an amount of excess diluent in the use solution during the product dispensing process.

In another embodiment, a dispensing system comprises a dispenser including a cavity and a nozzle, a solid product positioned within the cavity, a diluent source in fluid communication with the dispenser supplying a diluent to the nozzle, and a logic device controlling spray on and spray off cycles to pulse the diluent supplied to the nozzle as a pulsed diluent spray during a product dispensing process. The diluent contacts a surface of the solid product to dissolve at least a portion of the solid product and create a use solution. The pulsed diluent spray increases the concentration of the dissolved solid product in the use solution by limiting an amount of excess diluent in the use solution during the product dispensing process. The concentration of the dissolved solid product in the use solution is approximately 3.0 to 10.0% by weight of the use solution and the solid product is selected from the group consisting of a solid enzyme product, a solid neutral product, a solid alkaline product, and a solid acid product.

In another embodiment, a method of dispensing a solid product comprises placing a solid product in a cavity of a dispenser having a nozzle in fluid communication with a diluent source, the diluent source supplying a diluent to the nozzle, pulsing the diluent onto a surface of the solid product as a pulsed diluent spray to dissolve a portion of the solid product and create a use solution during a product dispensing process, wherein the pulsed diluent spray increases a concentration of the dissolved solid product in the use solution by limiting an amount of excess diluent in the use solution during the product dispensing process.

BRIEF DESCRIPTION OF THE DRAWINGS

The present invention can be more easily understood, and further advantages and uses thereof can be more readily apparent, when considered in view of the detailed description and the following Figures in which.

In accordance with common practice, the various described features are not drawn to scale but are drawn to emphasize specific features relevant to the present invention. Reference characters denote like elements throughout the Figures and the text.

DETAILED DESCRIPTION OF A PREFERRED EMBODIMENT

Figure 1:
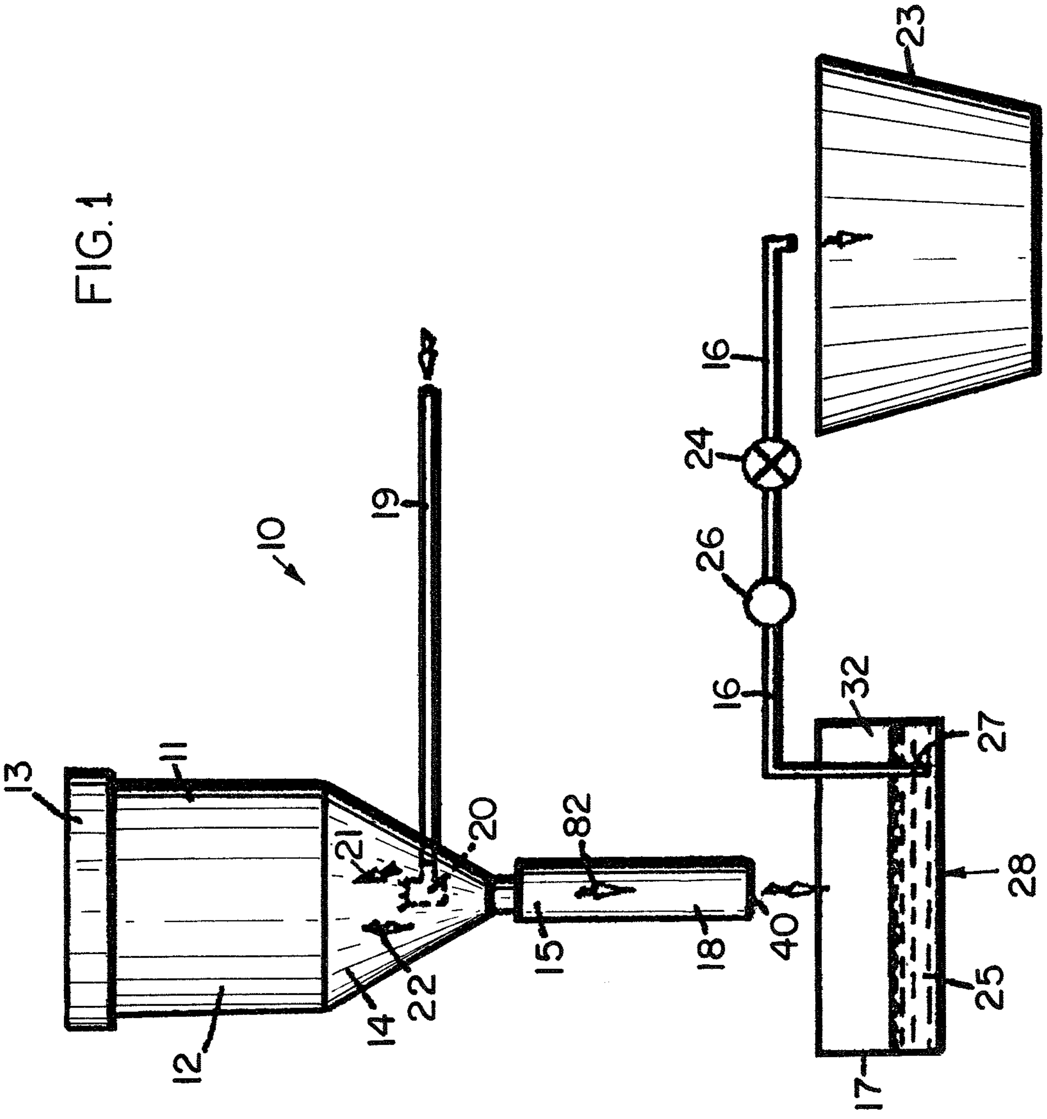
FIG. 1 is a schematic block diagram of a dispensing system constructed according to the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical or electrical changes may be made without departing from the spirit and scope of the present invention. The following detailed description is, therefore, not to be taken in a limiting sense, and the scope of the present invention is defined only by the claims and equivalents thereof.

The term "concentrated solution" means a solution comprising a diluent and at least a portion of a solid product that could be further diluted or used in its relatively concentrated form as a use solution without further dilution. The term "use solution" means a solution comprising a diluent and at least a portion of a solid product that is used without further dilution. The diluent could be one or more diluents. Although these terms "concentrated solution" and "use solution" are used throughout the description, it is understood that these solutions could be interchanged depending upon the type of product being used and the intended use of the product. For example, a use solution could be used without further dilution or it could be further diluted prior to use. Thus, the recitation of one type of solution does not limit the use to that type of solution.

One embodiment utilizes a solid product dispenser including a logic device, which controls the spray cycle, and a relatively low flow spray nozzle. Examples of dispensers that could be used are the ASEPTI-Solid and OptiPro dispensers by Ecolab Inc. and the dispensers disclosed in U.S. Pat. Nos. 4,690,305; 5,100,032; and 5,417,233; which are hereby incorporated by reference herein. These and other types of suitable dispensers could be modified to include a suitable logic device and a suitable nozzle.

In one embodiment, a dispensing system includes a dispenser, a logic device, a nozzle, a diluent source, and a solid product. The logic device controls spray on and spray off cycles to pulse the diluent supplied to the nozzle, which then contacts the solid product to dissolve a portion of the solid product and create a use solution during the product dispensing process.

It is thought that pulsing the spray of diluent during the product dispensing process controls the concentration of the dispensed product in the use solution by limiting the amount of excess diluent added to the dispensed product. The product is then more consistently dispensed and the concentration of the product in the use solution is more consistent. Additionally, the concentration of the dispensed product in the use solution can be controlled by changing at least one of a volume of diluent dispensed through the nozzle, a pressure of diluent, a pulsed diluent spray frequency, and a pulsed diluent spray duration.

Figure 8:
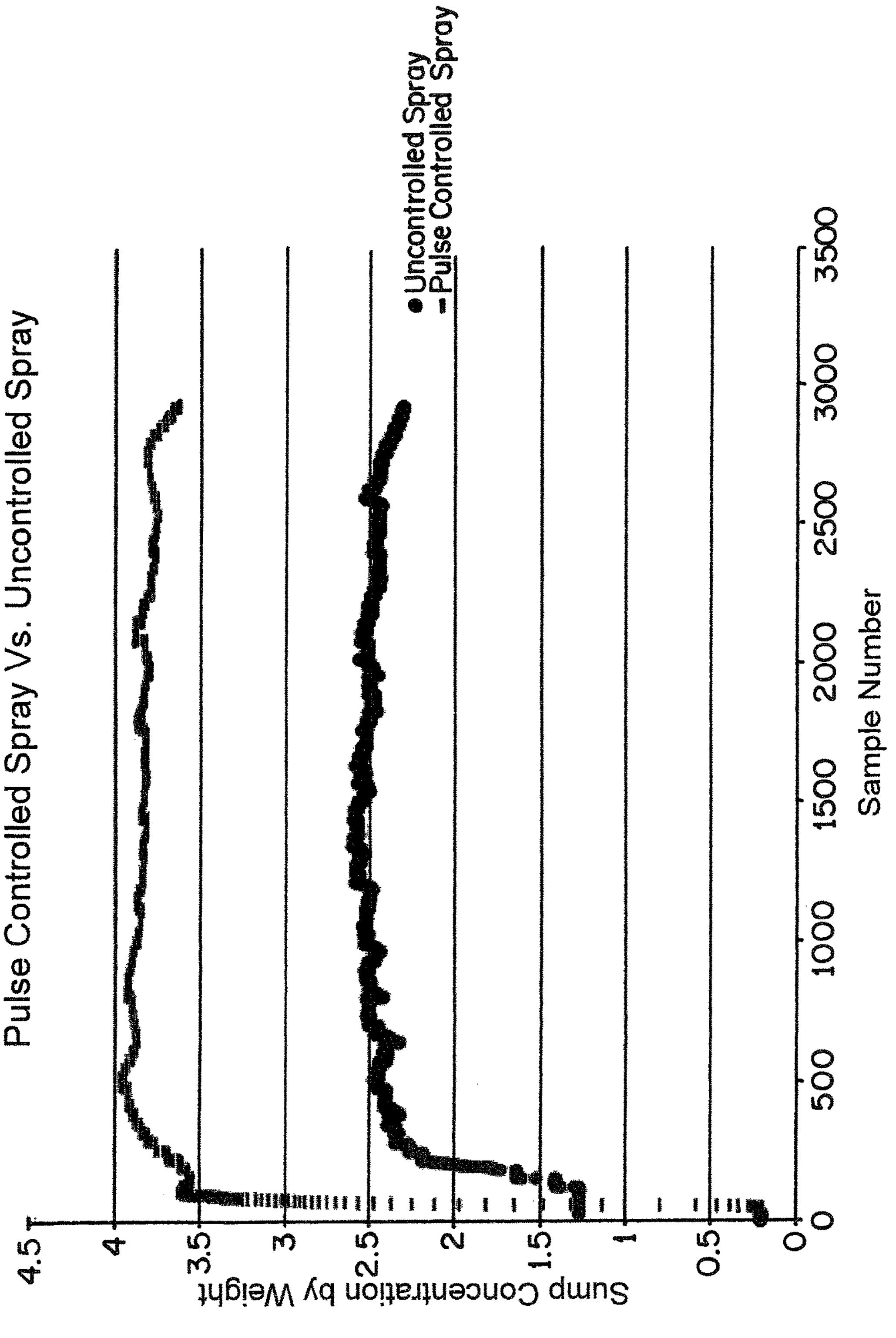
FIG. 8 shows the sump concentration of a dispensed portion of solid product by weight of the use solution in the sump for a pulse controlled spray and an uncontrolled spray.

For a solid enzyme product, one embodiment, which is shown in FIG. 8, enabled the ability to increase the concentration of the dispensed product in the dispenser's sump from approximately 2.50% to approximately 3.75% by weight of the use solution by utilizing pulsed spray of a diluent onto the solid product versus a non-pulsed spray. Further, this embodiment enabled the ability to target specific concentrations in the range from 3.0 to 10.0% of dispensed product in the dispenser's sump by adjusting the pulsed spray frequency and duration. It is recognized that the percentage of dispensed product in the use solution could vary depending upon the type of solid product. Among other variables, the diluent spray duration, also referred to as spray on time, and diluent spray frequency, also referred to as spray off time, (the pulsed spray of diluent on and off) are variables in controlling the concentration of dispensed product in the dispenser's sump and providing a consistent dosing of product.

Figure 2:
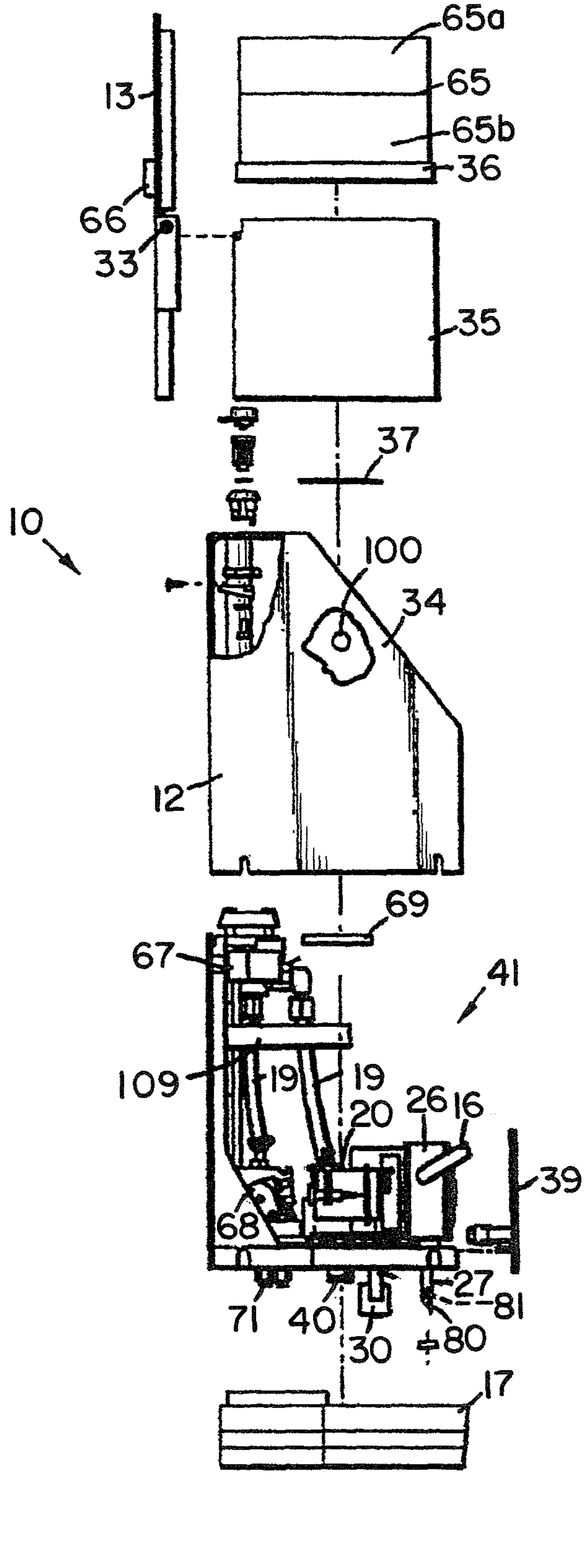
FIG. 2 is a side elevational and exploded view of the dispenser of FIG. 1.

An example solid product dispenser is shown in FIGS. 1 and 2. A dispensing system 10 has a housing 11 with an upper storage portion 12 for holding a solid product 65, as best seen in FIG. 2. Several blocks of solid product 65 may be placed within the upper storage portion 12. FIG. 2 illustrates two blocks 65*a* and 65*b*. A cover 13 extends across the upper end of the storage portion 12 to provide access to the cavity within the storage portion 12. At the lower end of the housing 11 is a collector portion 14. The lower end of the collector portion 14 defines an outlet port 15 for passage therethrough of solution collected by collector portion 14. Conduit 18 extends from the outlet port 15 to terminate at a position directly overlying the reservoir 17. The outlet port 15 directs the solution downwardly as illustrated by the arrow 82 by gravity. If the solution is not fed by gravity, a solution pump (not shown) could be provided in the outlet conduit 18.

A diluent supply inlet conduit 19 is connected to the housing 11 and is in fluid communication therewith for providing a source of diluent flow to a spray-forming nozzle 20. The nozzle 20 directs diluent, such as water, upwardly as shown by the arrow 21 in FIG. 1 so as to impinge upon the block of solid product 65 and dissolve at least a portion of the solid product, at which time the resulting liquid solution descends through the collector portion 14 as shown by the arrow 22 in FIG. 1. Control of the dispensing of the solution from the housing 11 is done by controlling the flow and the amount of diluent to nozzle 20, which may be done in a number of ways including mechanical means such as hydraulic timer valves and electrical means such as electrical switching in the control system (not shown) of the utilization vehicle 23 (i.e., a ware washing machine, washing machine, etc.).

The solid product 65 could be a pre-rinse product, an enzyme product, a detergent product, a rinse aid product, or any other suitable product that is dissolved at least partially by a diluent to create a concentrated solution added to a diluent line at mixer 24 to create a use solution. Thereafter, supply conduit 16 carries the diluent and the concentrated solution mixed to form a use solution to utilization point 23. Also located at mixer 24 is a pressure switch (not shown), which monitors the pressure of the diluent being delivered to utilization point 23. The pressure switch closes when diluent is being delivered. Therefore, the dispensing system 10 only operates when the use solution is required at the utilization point 23. Those skilled in the art will appreciate that other time periods for operation may be desired.

The concentrated solution 25 is collected within the reservoir 17 where it is available for use when necessary by the utilization vehicle 23. Supply conduit 16 transports the concentrated solution to the utilization vehicle 23 using a pump 26, such as a peristaltic pump, or other suitable flow control means. A pick-up conduit 27 extends within the reservoir 17 proximate the bottom wall 28 of the reservoir 17 to withdraw the concentrated solution.

A float is positioned within the reservoir 17 and operatively connected to a float switch 32. The float switch 32 is operatively connected to a logic device (not shown) that controls the spray on and spray off times. This logic device is connected to a spray control means (such as solenoid valve 68) for controlling the flow of diluent to the nozzle 20, in order to maintain a constant level of concentrated solution in the reservoir 17. When the level of concentrated solution in the reservoir 17 is below the desired constant level, the float switch 32 is electrically closed and the logic device will pulse the spray so that additional concentrated solution 25 is formed until the float 30 returns to its desired level.

Examples of suitable logic devices that could be used are individual SSAC solid state recycling timers manufactured by ABB Inc., various combinations of SSAC solid state recycling timers manufactured by ABB Inc., printed circuit boards, printed circuit boards including microprocessors, programmable logic controllers, logic software residing on a computer CPU, a control device of utilization vehicle 23, mechanical timing cams, or any other suitable logic devices well known in the art. Any of these logic devices could be used to adjust the spray on and spray off cycles to pulse the diluent spray and control the concentration of the dispensed use solution.

The dispenser of the dispensing system 10 is preferably configured and arranged to be mounted upon a mounting surface such as a wall near the utilization vehicle 23. Alternatively, the dispenser of the dispensing system 10 could be configured and arranged to be included as a component of the utilization vehicle 23. The container 12 preferably has a hood 34, the upper portion of which contains the housing 35 for the solid product 65 and the lower portion of which contains the flow control assembly 41. The hood 34 is preferably made of a stainless steel or molded plastic material. Hood 34 preferably includes two apertures 100 formed therein which are sized and oriented through the center line of the dispenser. The apertures 100 are located at a predetermined height within dispenser, wherein the low product alarm (not shown) detects a low product condition prior to actually running out of product.

Preferably, the low product alarm is enabled when the solid product drops to a level where the height of the remaining product is equal to the height of one block 65 remaining in the storage portion 12. Sensor bracket/flange 109 is mounted within container 12, and is configured and arranged to place emitter (not shown) and receiver (not shown) in operative position relative to the apertures 100. The preferred orientation of the sensors is proximate apertures 100 and forming a line starting with the emitter, continuing through the centers of apertures 100, and ending at the receiver. Those skilled in the art will appreciate that any number of other orientations of the sensors may be provided in order to monitor the amount of solid product remaining in the dispenser.

The size and shape of the housing 35 preferably corresponds with the size and shape of the solid product 65, which is slightly smaller than the size and shape of the housing 35, and is preferably cylindrical. A front panel assembly 39 is attachable to the front portion of the hood 34. The housing 35 is preferably made of a clear or translucent plastic material, or contains a clear window, so as to enable an operator to visually discern the level of solid product 65 contained therein. Additionally, the housing 35 is preferably constructed of a material that does not interfere with the low product alarm. Thus, clear or translucent plastic is preferred. However, those skilled in the art will appreciate that other types of material might be used which are more opaque. In that event, either additional apertures or plastic inserts (i.e., translucent or clear inserts) can be provided.

The cover 13 is connected to the upper storage portion 12 by means of a hinge 33. A magnet 66 on the cover 13 controls the opening and closing of a proximity switch 67, and opening the cover 13 causes the proximity switch 67 to open and to turn off operation of the solenoid valve 68, which controls diluent flow. This provides a safety feature to prevent the operator's exposure to the solid product 65 and the concentrated solution 25. Grates 36 and 37 are preferably positioned below the solid product 65, with the grate 36 having relatively larger apertures and supporting the solid product 65. The grate 37 is positioned within the hood 34 and has relatively smaller apertures, preferably on the order of one-half inch in diameter, so as to trap undesirable particles from entering the concentrated solution.

There is a seal 69 which serves as a divider between the wetted product portion of the dispenser above the seal 69 and the electronic flow control assembly 41 below the seal 69. The seal 69 could be a U-cup, an O-ring, or any other suitable seal. The diluent enters the dispenser's diluent supply inlet conduit 19 at diluent inlet point 71. The diluent supply inlet conduit 19 is provided with a vacuum breaker assembly 70 which prevents backflow of the product into the diluent supply line. The concentrated solution then exits into the reservoir 17 proximate the outlet port 40. The concentrated solution is withdrawn from reservoir 17 via the pick-up conduit 27 and the pump 26, and then the concentrated solution is directed to the utilization vehicle 23 via conduit 16.

Proximate the lower end of the dispenser is the reservoir 17, which is preferably made of a plastic material such as polymethylpentene or polypropylene and is formed of a single, unitary piece. These types of plastic materials have resistance to heat and chemicals. Preferably, the reservoir 17 is made of a transparent or translucent material to allow the operator to see the amount of concentrated solution 25 in the reservoir 17. The reservoir 17 includes a sump (not shown) within the reservoir 17. A sump of the type utilized in dispensing system 10 is more fully discussed in U.S. Pat. No. 5,100,032, which is hereby incorporated herein by reference.

Positioned within the reservoir 17 is a pick-up conduit 27. When concentrated solution is needed in the utilization vehicle 23, the pump 26 is energized and concentrated solution is withdrawn from the reservoir 17 via the pick-up conduit 27. The bottom of the pick-up conduit 27 is positioned slightly above the bottom of the reservoir 17, preferably approximately an eighth of an inch. The pick-up conduit 27 is preferably made of a polypropylene material. The pick-up conduit 27 contains a suitable flow indicator 80 such as one having a ball float 81, to enable the operator to visually monitor flow of the wash chemical from the reservoir 17.

The dispenser outlet 40 is positioned directly above a sump, so that the concentrated solution dispenses into the sump and then overflows into the reservoir 17. Each dispensing cycle produces approximately 30 milliliters ("ml") of liquid. As used herein, the term "dispensing cycle" refers to a single activation of the float switch 32. The switch 32 may be activated more than once during a single cycle of the utilization vehicle 23. Preferably, the volume of the reservoir 17 is enough for approximately two to five cycles in the utilization vehicle 23. By making up a quantity of concentrated solution 25 and storing it in the reservoir 17, the concentrated solution is immediately available whenever the utilization vehicle 23 requires it.

Although not shown in the dispensing system 10, the dispensing system 10 is preferably modified to include a suitable logic device and a suitable nozzle. An example of a suitable logic device is a SSAC solid state recycling timer manufactured by ABB Inc., and an example of a suitable nozzle is a Full Jet spray nozzle manufactured by Spraying Systems Co.

Figure 3:
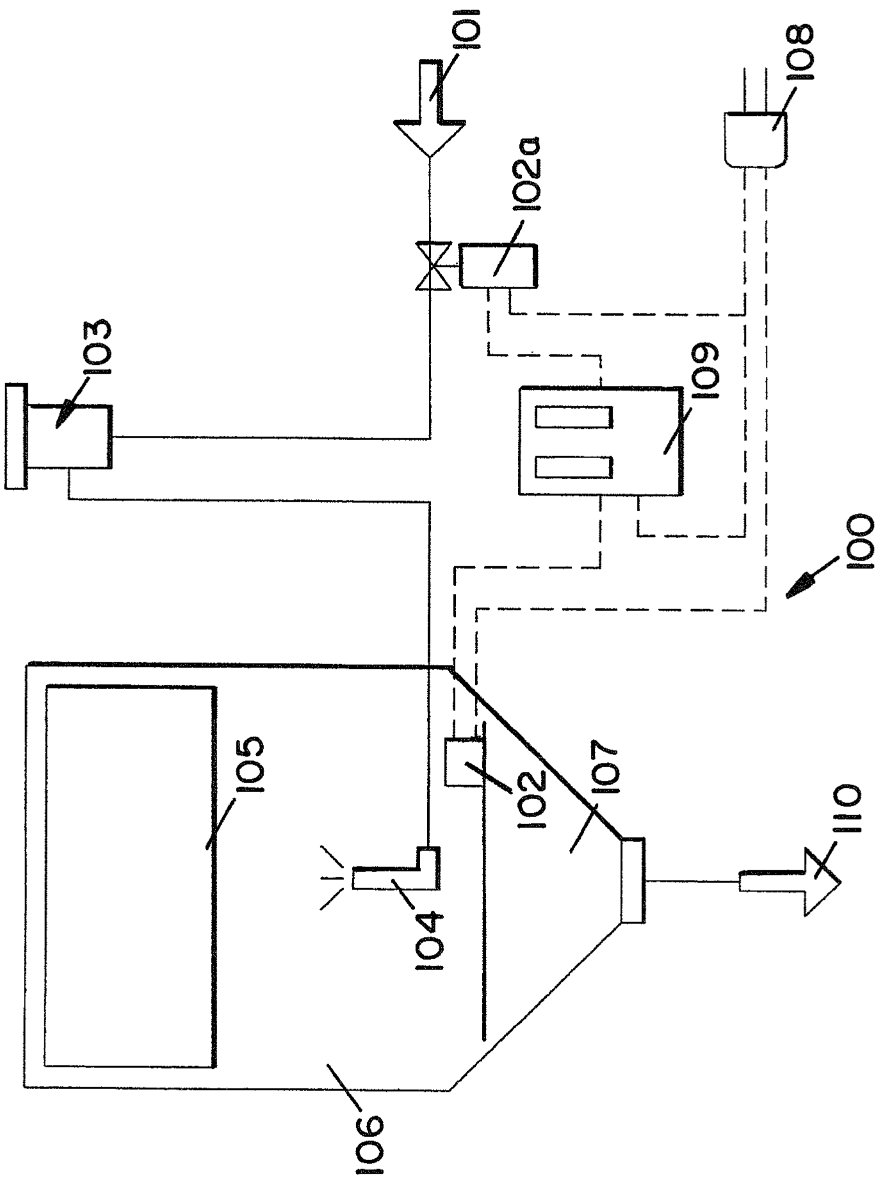
FIG. 3 is a schematic block diagram of another embodiment dispensing system constructed according to the principles of the present invention.

Another example dispensing system 100 utilizing a dispenser 106 is shown in FIG. 3. The dispenser 106 could be any suitable dispenser. A solid product 105 is used to create a concentrated solution by pulsing the spray of a diluent through a nozzle 104 onto the solid product 105. The diluent supply inlet conduit 101 is provided with a vacuum breaker assembly 103 which prevents backflow of the product into the diluent supply line. The solid product 105 is turned into a concentrated solution primarily through dissolving at least a portion of the solid product 105 into the diluent, which is preferably water, pulsed through the nozzle 104. The concentrated solution is stored in the sump reservoir 107. The diluent is pulsed through the nozzle 104 to increase the concentration of the concentrated solution by reducing or eliminating the over-spraying and letting the maximum amount of diluent contact the solid product surface to maximize the dissolution process of the solid product 105.

A level switch 102 such as a float switch in the sump reservoir 107 will detect the absence of concentrated solution, typically due to dispensing of a portion of the concentrated solution into a machine such as a warewashing machine through outlet conduit 110, and the detected absence of concentrated solution will trigger the timing device 109 to activate. This timing device 109 will open the solenoid valve 102A for a relatively short amount of time (0.1 to 2.0 seconds). This will allow a small volume of diluent flowing through the diluent conduit 101 to spray, through the nozzle 104, onto the solid product 105. The bottom surface of the solid product will be wetted and through dissolution a concentrated solution will be created, which will drip into the sump reservoir 107. After a delay time (5.0 seconds to 5.0 minutes) the timing device 109 will re-trigger the solenoid valve 102A, which will spray another pulse of diluent onto the solid product 105. This cycle will continue to repeat until the sump reservoir 107 is filled with enough concentrated solution to trigger the level switch 102 that the sump reservoir 107 is sufficiently replenished and then the timing device 109 will be turned off. An electrical plug 108 supplies power to the system 100.

In one possible embodiment, when a solid product such as a solid enzyme product is used, the spray is pulsed such that during each spray cycle, approximately 50 ml of diluent is sprayed onto the solid product for 0.1 to 2.0 seconds to dissolve a portion of the solid product via a combination of impingement force and contact solubility, there is a delay in the spray for 5.0 seconds to 5.0 minutes, and this spray on/spray off is repeated seven times to create approximately 350 ml of concentrated solution, which is directed into a sump. Preferably, the sump is configured and arranged to contain approximately 1200 ml of concentrated solution, and approximately 350 ml of concentrated solution is directed from the sump to the machine. Depending upon the type of product used, the quantity of diluent and the spray on and off times could be changed to achieve the desired dosing.

Figure 4:
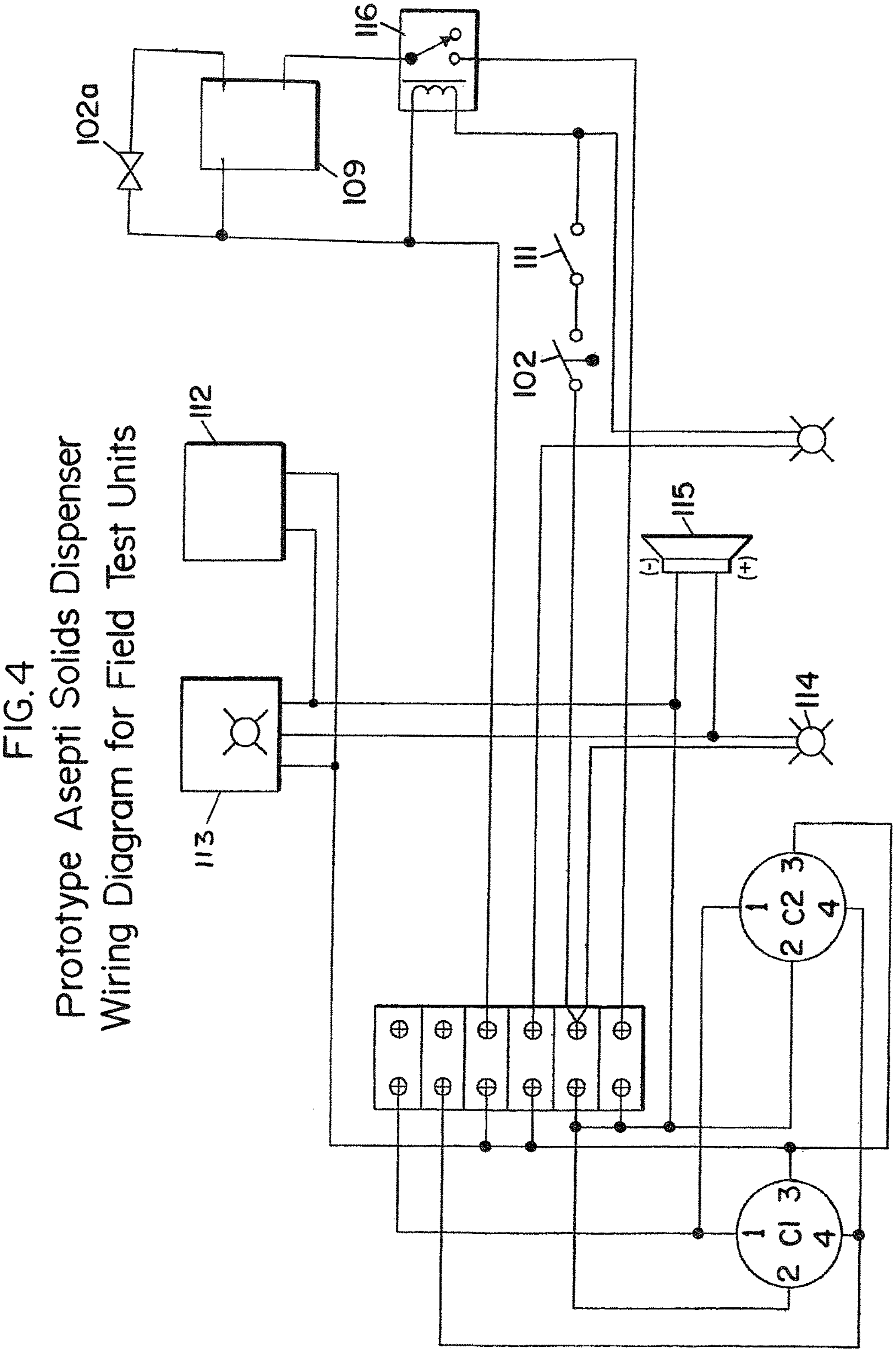
FIG. 4 is an embodiment of a suitable wiring diagram for the dispensing system shown in FIG. 3.

A suitable wiring diagram is shown in FIG. 4 illustrating the electrical elements of the dispensing system 100. In this embodiment, a solid product such as a solid enzyme product is being dispensed and the float switch 102 closes when the concentrated solution is being dispensed or the level of concentrated solution is otherwise reduced within the sump reservoir.

In series with the float switch 102 is a cover switch 111, which closes when the cover is closed. Also in series with the float switch 102 and the cover switch 111 is a relay switch 116, which closes when both the float switch 102 and the cover switch 111 are closed to turn on a timing device 109. The timing device 109 controls a solenoid valve 102*a* in fluid communication with a diluent source. Those skilled in the art will appreciate that the timing device 109 only opens the solenoid valve 102*a* (i.e., starts the spray cycle to allow the spray nozzle to spray the solid product block) when float switch 102 indicates that the level of concentrated solution is reduced within the sump reservoir and closes when the cover switch 111 is closed, thus closing the relay switch 116.

The timing device 109, which controls the solenoid valve 102A, controls the timing of the diluent's spray on/spray off. The timing device 109 can be set to the desired spray on/spray off times. The timing device could be a timing switch, as illustrated, or it could be a circuit board or any other suitable timing device.

A low product alarm includes an emitter 112 and a receiver 113. The emitter 112 generates an infrared beam that is received by the receiver 113 when the solid product is low, when the solid product no longer blocks the infrared beam. When the infrared beam is received by the receiver 113, the receiver 113 turns on and provides voltage to operate the visual and audible indicators 114 and 115, respectively. C1 and C2 are termination plugs to connect the dispenser to power and daisy chain the dispensers together.

An example of possible uses for dispensing system embodiments is surgical instrument cleaning. Although any suitable solid product could be used, examples of products that could be used are ASEPTI-Solid Acid Rinse/Detergent, ASEPTI-Solid Alkaline Detergent, ASEPTI-Solid Enzyme, ASEPTI-Solid Neutral Detergent, OptiPro Enzyme and OptiPro Neutral Detergent by Ecolab Inc. Preferably, for solid products such as solid enzyme products, solid neutral products, solid alkaline products, and solid acid products, the concentration of the dissolved solid product in the use solution is approximately 3.0 to 10.0% by weight of the use solution.

For OptiPro Enzyme by Ecolab Inc., embodiments successfully controlled the concentration of the dispensed product and enabled users to increase the concentration of the dispensed product in the dispenser's sump from 2.0 to 4.0% to 3.0 to 6.0% by weight of the concentrated solution by utilizing pulsed spray of a diluent onto the solid product. FIG. 8 shows one embodiment that increased the concentration of the dispensed product in the dispenser's sump from 2.50% to 3.75% by weight of the use solution by utilizing pulsed spray of a diluent onto the solid product versus a non-pulsed spray. In this embodiment, utilizing a pulsed spray of diluent increased the concentration of the dispensed product in the sump by 50%. The pulsed spray increases the concentration of the concentrated solution in the sump because it allows the maximum amount of dilution per unit of diluent. This is accomplished by maximizing the amount of diluent that contacts the solid product and maximizing its residence time on that product. Both of these factors assist in increasing the concentration of the concentrated solution in the sump.

Among other variables, the diluent spray on time and diluent spray off time (the pulsed spray of diluent on and off) are variables in controlling the concentration of dispensed product in the dispenser's sump and providing a consistent dosing of product. Other variables could include product composition, product surface area to be wetted, type of diluent, diluent temperature, diluent pressure, room temperature, humidity, and concentration of the concentrated solution or use solution. It is recognized that there could be additional variables.

It is thought that pulsing the spray of diluent controls the concentration of the dispensed product in the concentrated solution or use solution by limiting the amount of excess dilutant added to the dispensed product during the product dispensing process. The product is then more consistently dispensed and the concentration of the product in the concentrated solution or use solution is more consistent. Additionally, the concentration of the product in the concentrated solution or use solution can be controlled by changing either the pulsed spray frequency, the pulsed spray duration, or both pulsed spray frequency and spray duration.

Adjustments to pulsed spray frequency and duration can be achieved through either a closed loop system or an open loop system. An example of a closed loop system would be one that measures the concentration of the dispensed product in the use solution and provides the measurement to a control device. If the measured concentration is not equal to a preset target concentration, the control device is able to adjust the pulsed spray duration and/or pulsed spray frequency in order to achieve the target concentration. Examples of suitable concentration measurement devices include load cells to measure weight loss of the solid product, load cells to measure use solution weight, conductivity cells to measure the concentration of the dissolved solid product in the use solution, flow meters to measure diluent volume, conductivity sensors to measure conductivity of the use solution, colorimetric sensors to measure color of the use solution, and ultrasonic sensors to measure a dimensional change in the solid product. Additionally, the user could also perform testing to provide closed loop control of dilute product concentration. Examples of suitable tests a user could perform include refractometer readings, titrations, and test strips. These examples of suitable concentration measurement devices are intended for exemplary purposes only and not intended to be limiting. Further, these examples of suitable concentration measurement devices could be used individually or in various combinations that are known to those skilled in the art.

An example of an open loop system would be one that does not measure the concentration of the dispensed product in the concentrated solution or use solution but rather makes adjustments to the pulsed spray duration and/or frequency to account for changes in environmental conditions. Such a system could adjust pulsed spray duration and/or frequency to account for variations in diluent temperature, ambient temperature, diluent pressure, water hardness, or a variety of other environmental conditions.

Example 1

The OptiPro dispenser by Ecolab Inc. was tested using the OptiPro Enzyme product by Ecolab Inc. During testing, the concentration in the dispenser's sump increased as the time between dispenser cycles increased. Also, the concentration in the sump increased as the amount of the OptiPro Enzyme product removed from the sump per cycle decreased. It was determined that both of these variables could be expressed as the spray on time and the spray off time of the diluent.

Example 2

A Design of Experiments ("DOE") was conducted to investigate the affects of spray on time and spray off (delay) time on the concentration of the concentrated solution in the sump of the ASEPTI-Solid and OptiPro dispenser by Ecolab Inc. The experiments were conducted using a conductivity analyzer and a data logger to measure the conductivity of the concentrated solution and converting the conductivity into a percent weight of concentration. The experiments were run continuously to accelerate testing, which means that the spray cycle continued to run until the block of solid product was depleted. In normal operation, the spray cycle would only run until the sump of the dispenser was at a full level and would not run again until the machine (in this case a surgical instrument washing machine) pulled concentrated solution again which could be anywhere from immediately to several days.

Figure 5:
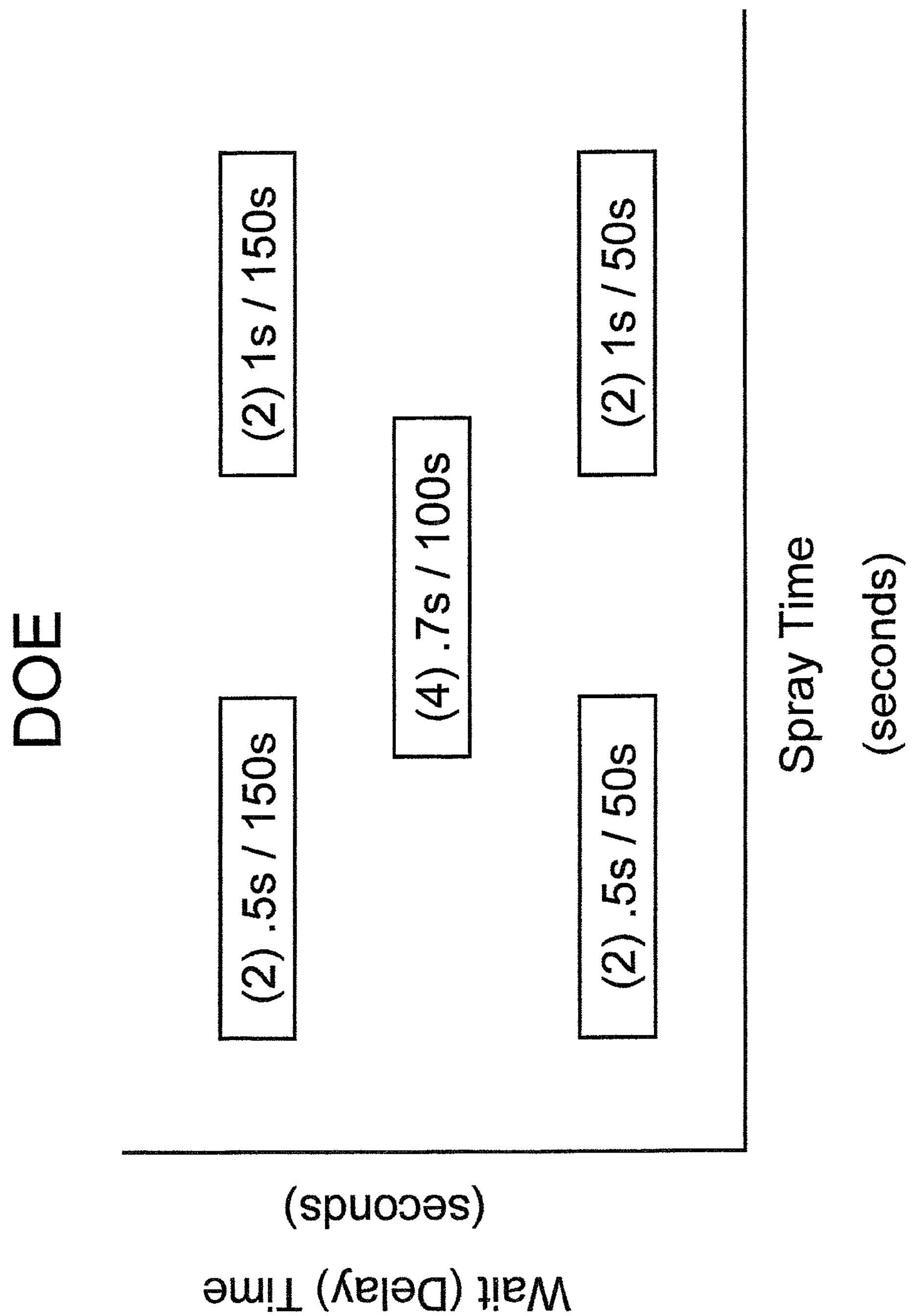
FIG. 5 is a pictorial representation of dispenser settings (diluent spray on and spray off times) used in a Design of Experiments ("DOE")

FIG. 5 shows the DOE. The spray on times used were 0.5, 0.7, and 1.0 seconds. The spray off times used were 50, 100, and 150 seconds. All of the tests were performed twice except for the mid-point (0.7 seconds/100 seconds), which was performed four times.

Figure 6:
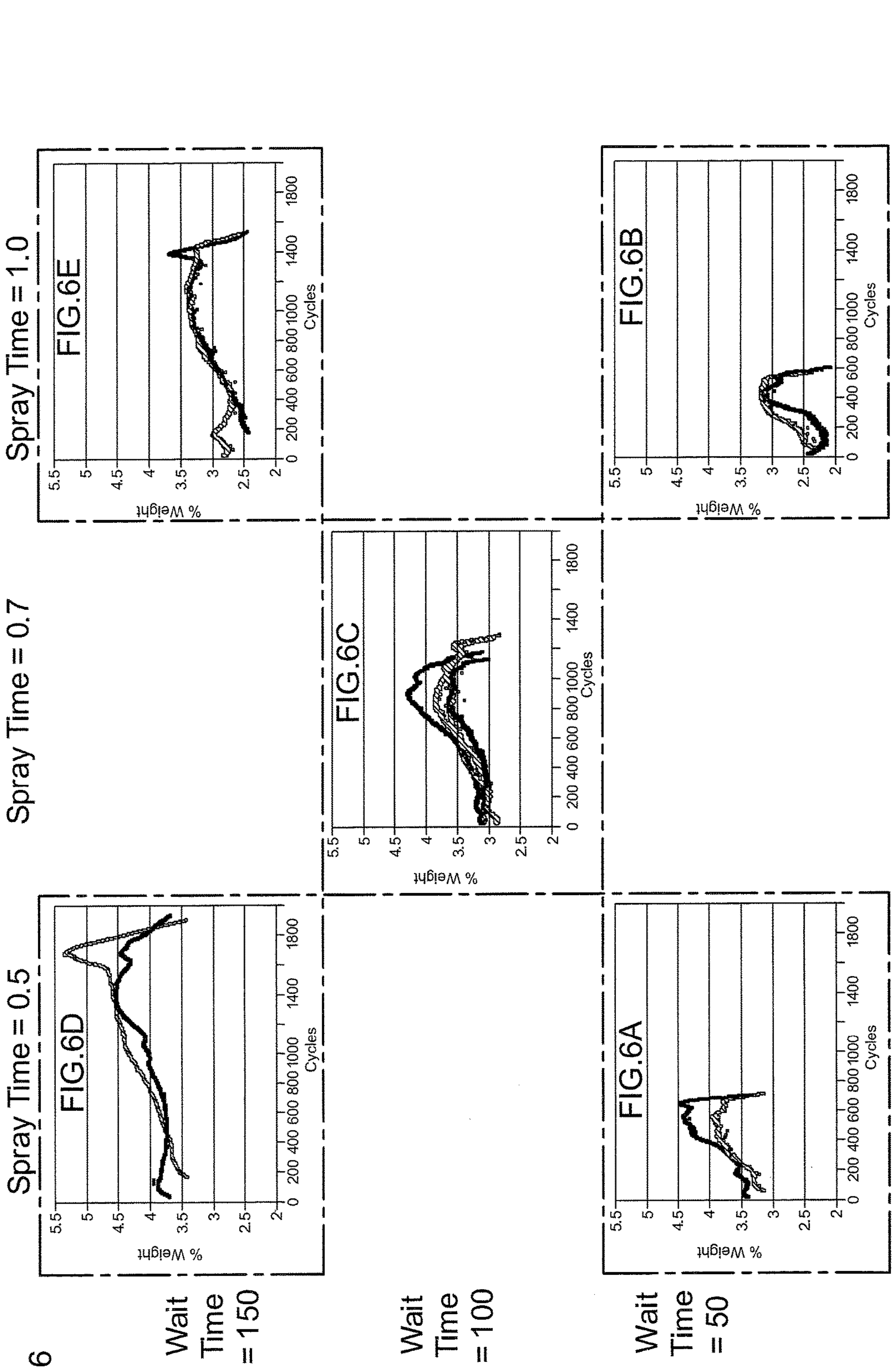
FIG. 6 includes FIGS. 6A though 6E that show dispensing profiles from DOE of FIG. 5.
Figure 6A:
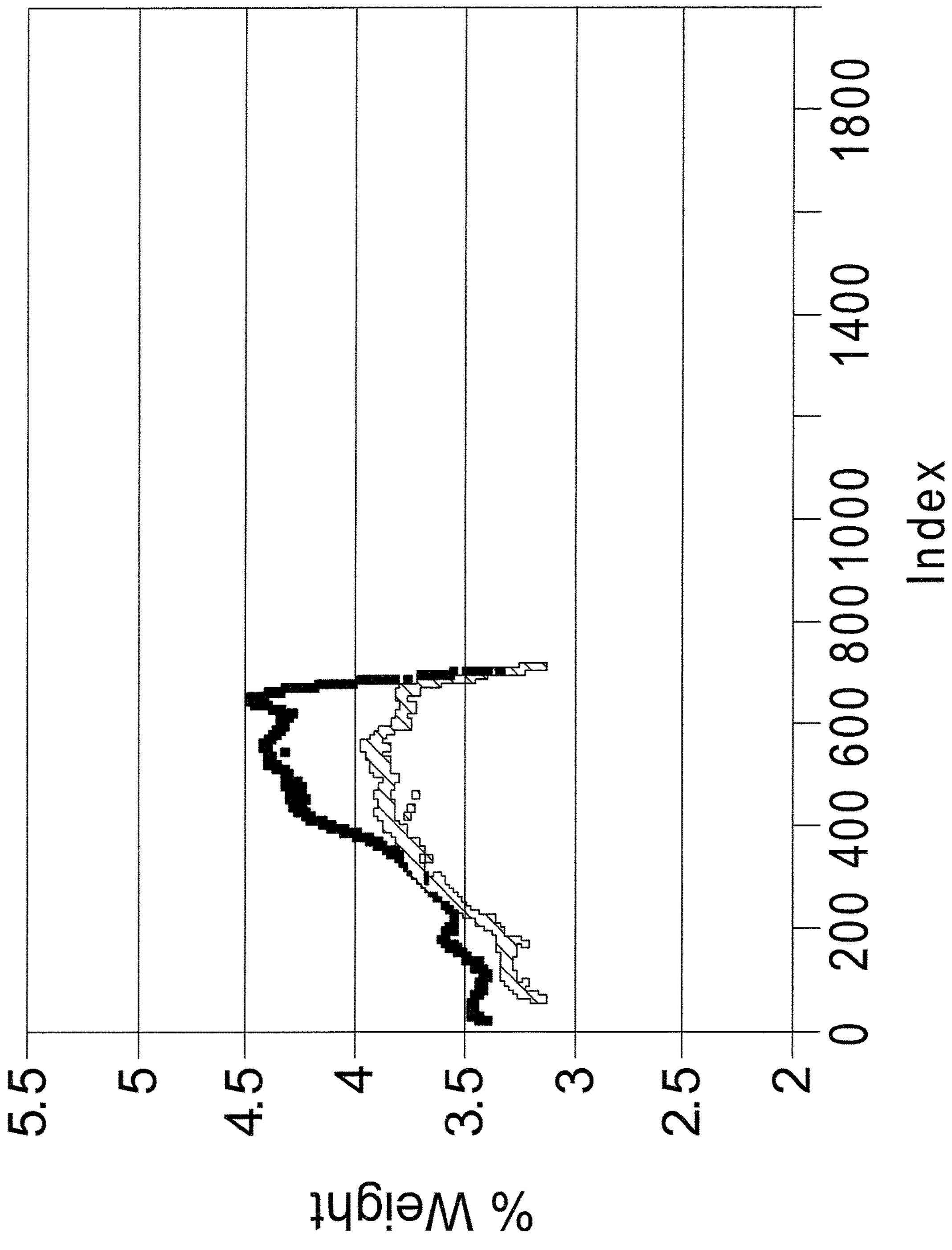
Figure 6B:
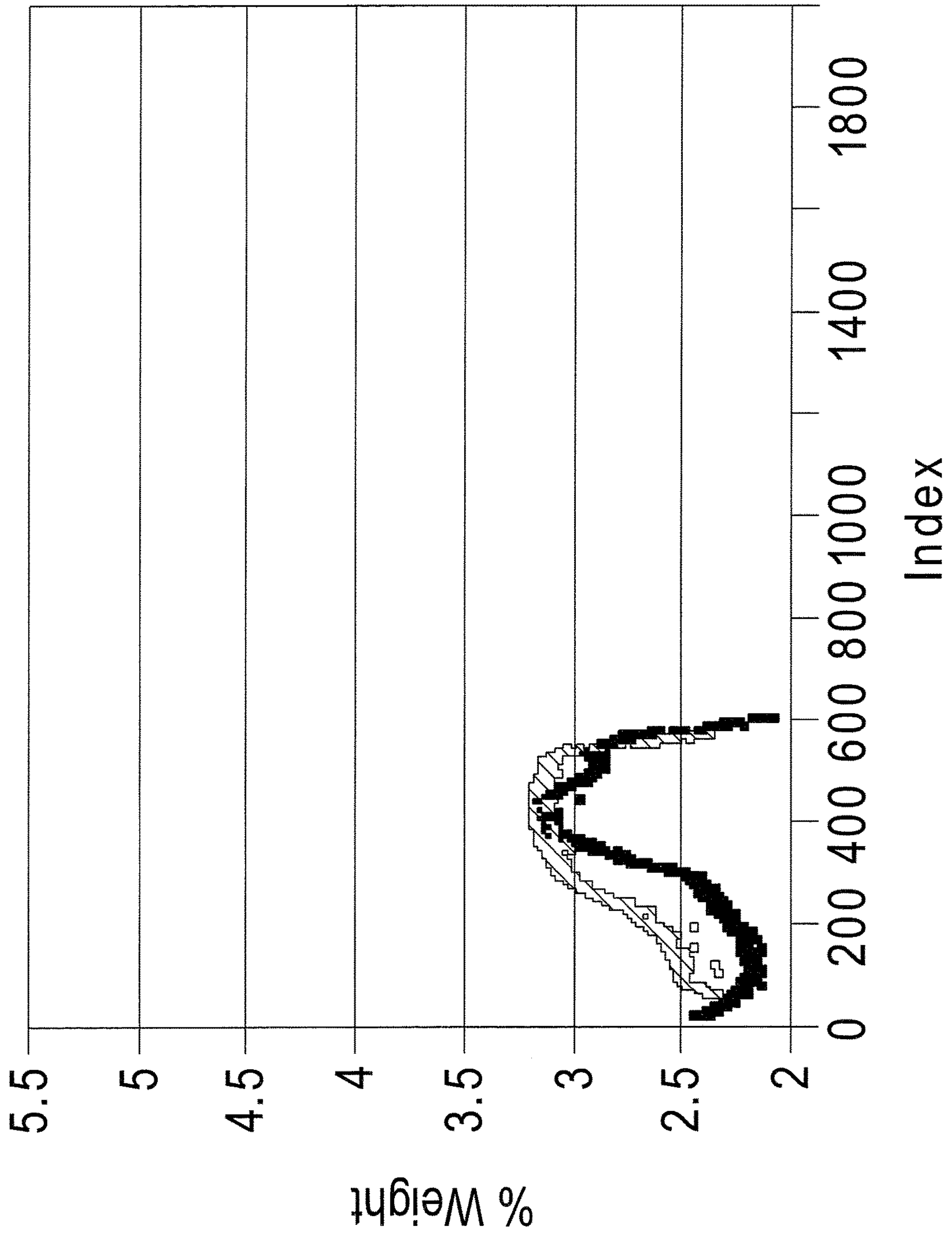
Figure 6C:
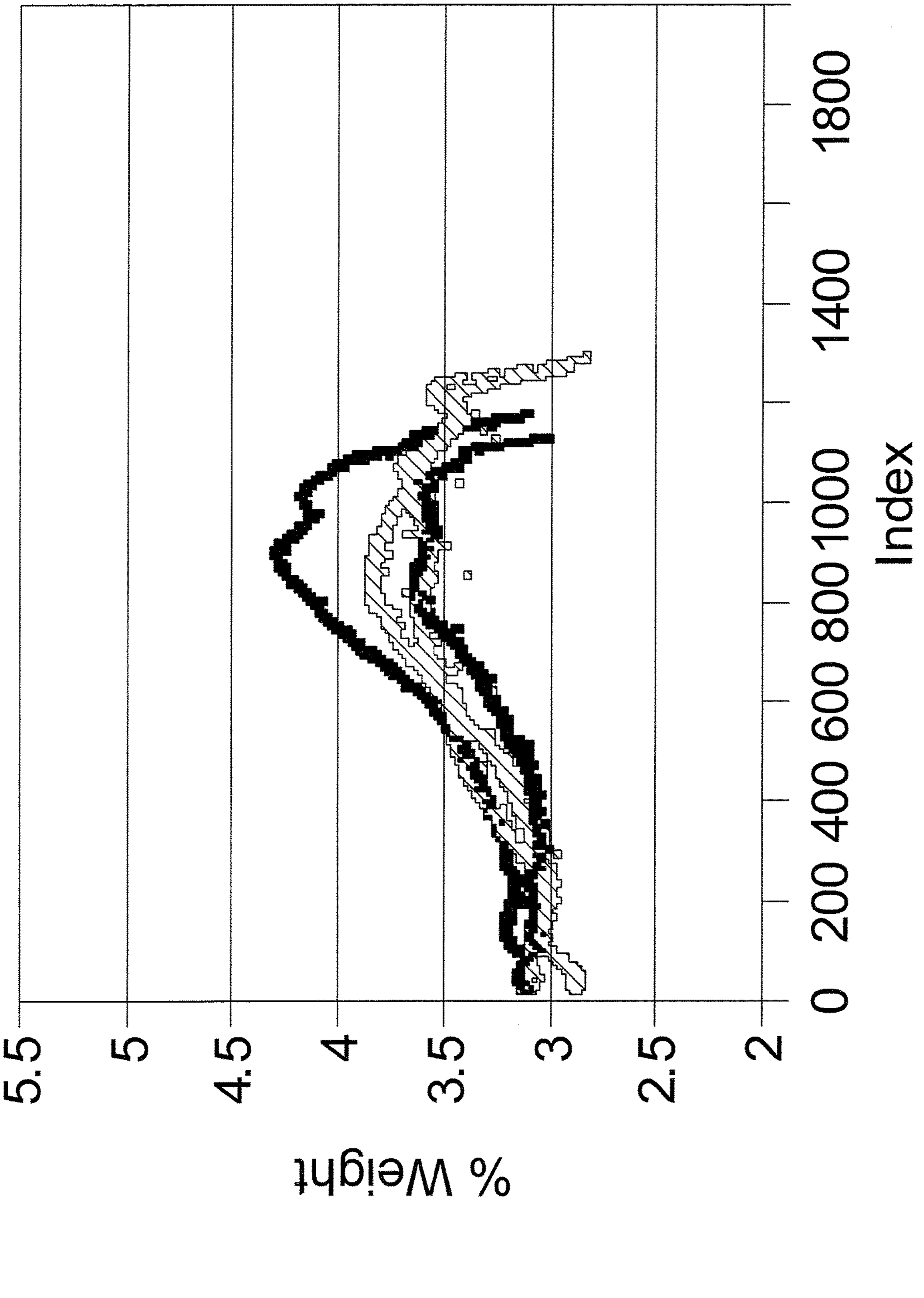
Figure 6D:
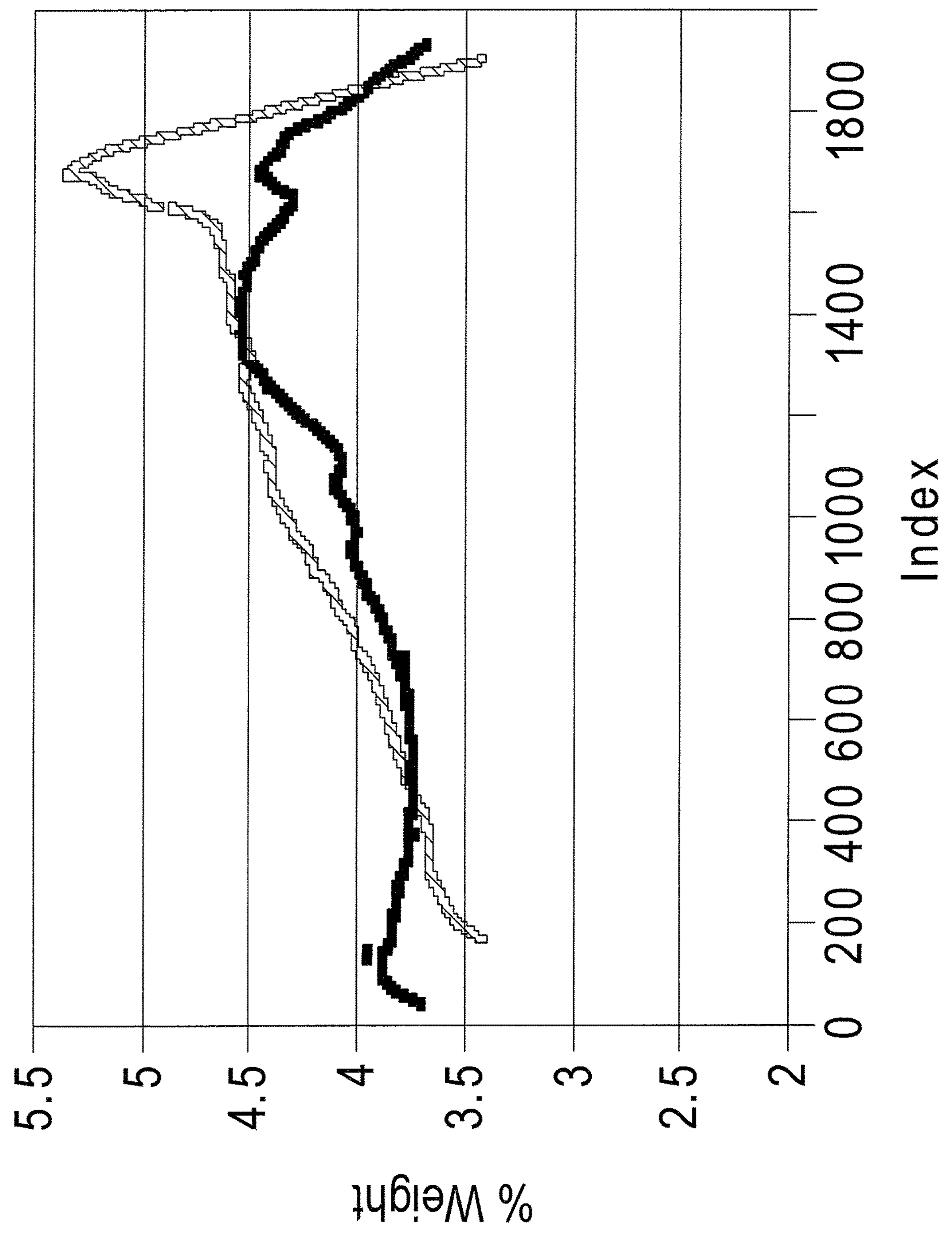
Figure 6E:
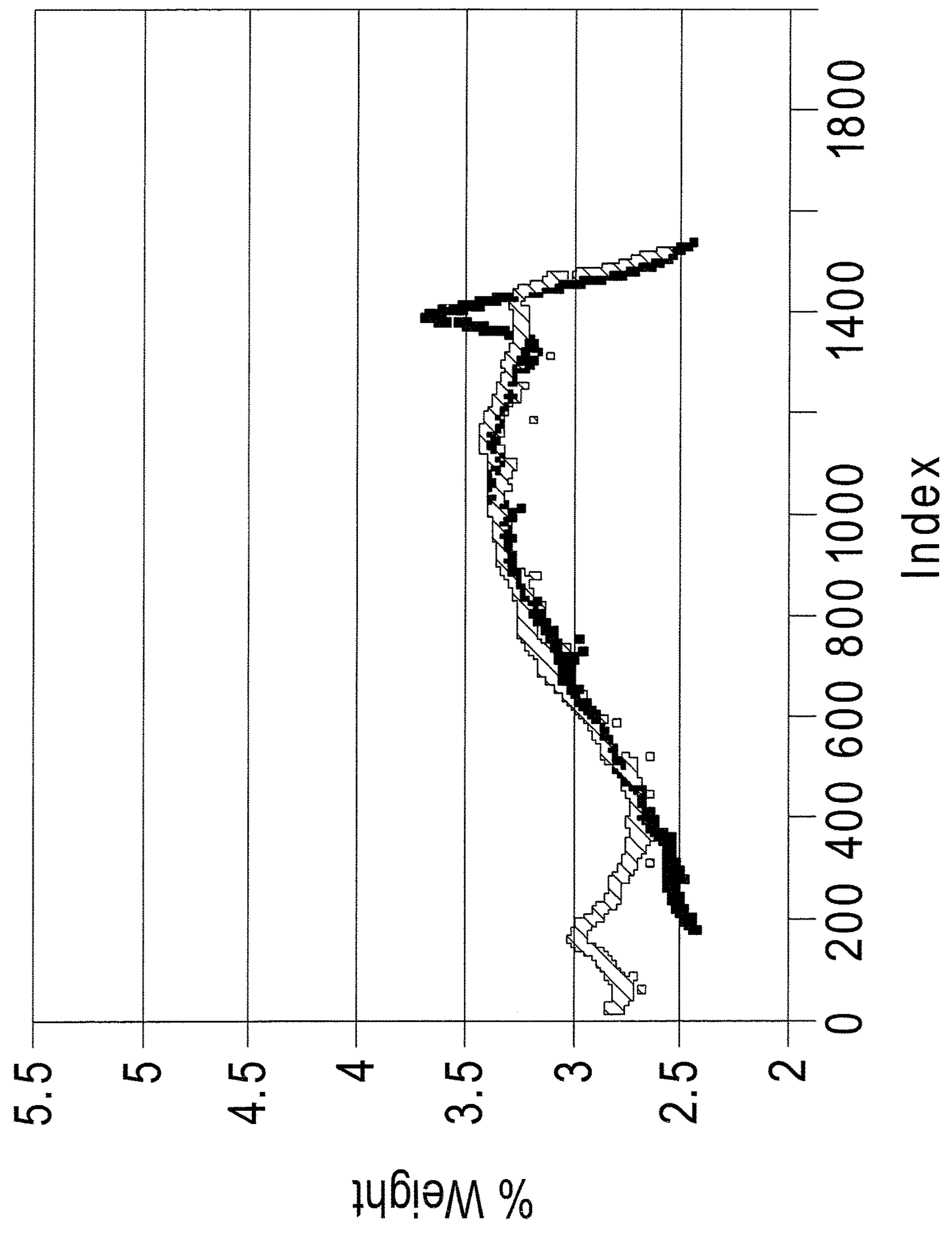

FIGS. 6A though 6B of FIG. 6 show the weight percentage of the dispensed product in the concentrated solution for cycle counts for each DOE shown in FIG. 5. Each line represents an individual experiment run. The multiple runs shown in each graph are replicates that were conducted with the conditions noted in the figure. FIG. 6A shows the results for a spray on time of 0.5 seconds and a wait time of 50 seconds. FIG. 6B shows the results for a spray on time of 1.0 seconds and a wait time of 50 seconds. FIG. 6C shows the results for a spray on time of 0.7 seconds and a wait time of 100 seconds. FIG. 6D shows the results for a spray on time of 0.5 seconds and a wait time of 150 seconds. FIG. 6E shows the results for a spray on time of 1.0 seconds and a wait time of 150 seconds.

Figure 7:
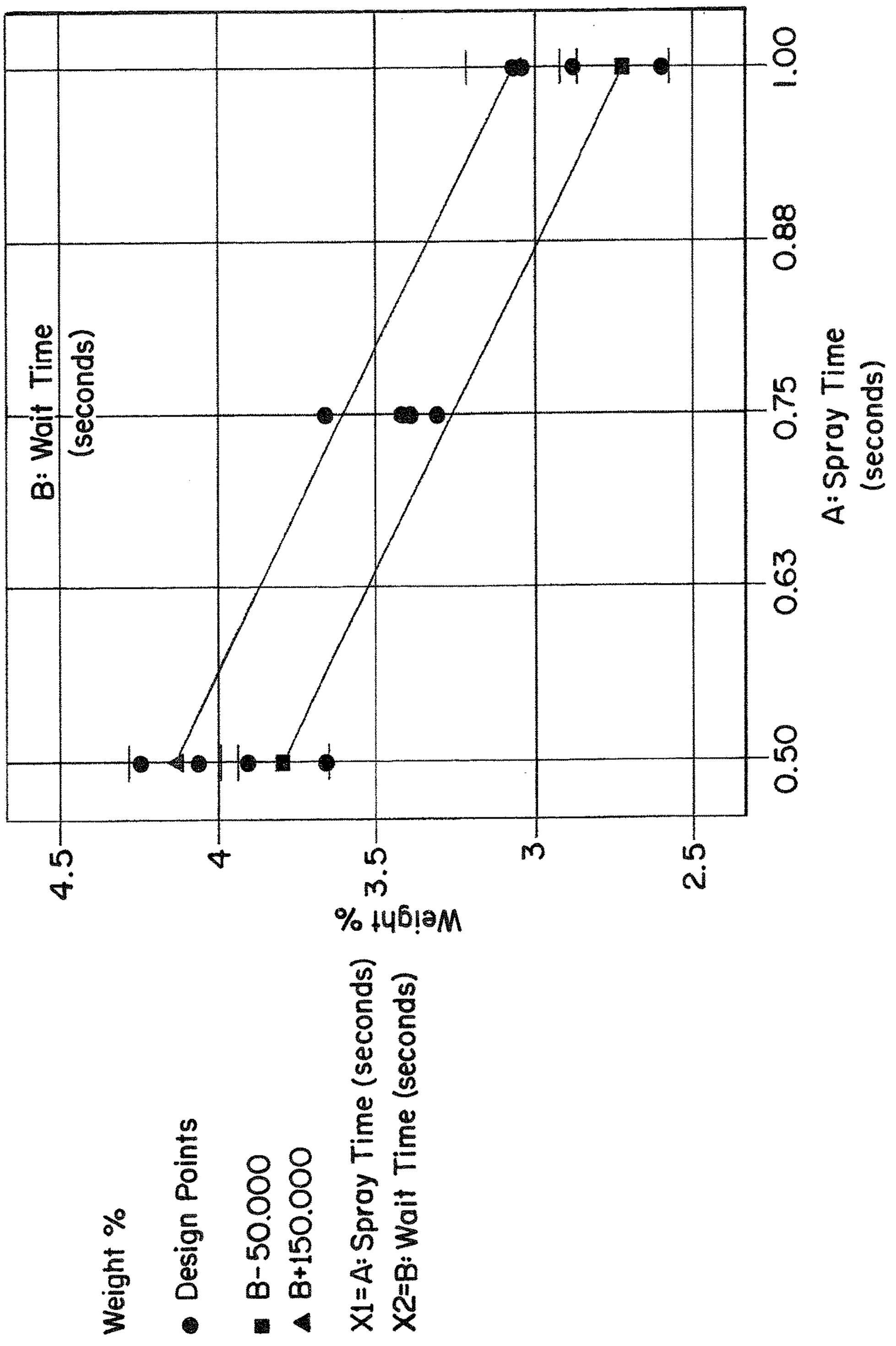
FIG. 7 is a graph showing the average effects of spray on time and spray off (delay) time using the averages of the dispensing profiles of FIG. 6.

FIG. 7 shows an interaction plot of spray on time and spray off (delay) time. The top line shows the results for the 150 seconds spray off time and the bottom line shows the results for the 50 second spray off time.

The results show that shortening the spray time from 1.0 second to 0.5 second increased the sump concentration by 1.0% by weight, the relationship between spray time and sump concentration was linear, increasing the delay time from 50 seconds to 150 seconds increased the sump concentration by 0.35% by weight, the relationship between delay time and sump concentration was linear, and there was no interaction between spray time and delay time.

Example 3

As shown in FIG. 8, the graph titled "Pulse Controlled Spray vs. Uncontrolled Spray" shows the sump concentration of a dispensed portion of solid product by weight of the use solution in the sump for a pulse controlled spray and an uncontrolled spray.

The OptiPro dispenser by Ecolab Inc. was tested using the OptiPro Enzyme product by Ecolab Inc. In the experiments, solid products of the same chemical formula were dispensed with either a pulsed water spray of 0.7 seconds on and 20 seconds off or a continuous non-pulsed water spray during the product dispensing process. The experiments were conducted using a conductivity analyzer and a data logger to measure the conductivity of the concentrated solution and converting the conductivity into a percent weight of concentration. As shown in FIG. 8, the "Pulsed Control Spray" yielded a sump concentration approximately 1.25% by weight higher than when the same product was dispensed using a continuous non-pulsed water spray. The light gray line represents the concentration of the dispensed solution when using a pulsed diluent spray at the spray times described and the dark gray line represents the concentration of the dispensed solution when using a continuous non-pulsed water spray. The results show that by using a pulsed spray to control the amount of excess diluent used to dissolve a portion of the product, the sump concentration is increased.

The above specification, examples, and data provide a complete description of the manufacture and use of the composition of embodiments of the invention. Since many embodiments of the invention can be made without departing from the spirit and scope of the invention, the invention resides in the claims hereinafter appended.

We claim:

1. A method of dispensing a solid product, comprising:
placing a solid product in a cavity of a dispenser having a nozzle in fluid communication with a diluent source, the diluent source supplying a diluent to the nozzle;
controlling nozzle spray on and spray off cycles to pulse the diluent onto a surface of the solid product as a pulsed diluent spray to dissolve a portion of the solid product and create a use solution during a product dispensing process, wherein the pulsed diluent spray increases a concentration of the dissolved solid product in the use solution by limiting an amount of excess diluent in the use solution during the product dispensing process;
detecting a level of the use solution in a reservoir;
turning off a timing device when a desired level of the use solution is detected; and
turning on the timing device when a lower level than the desired level of the use solution is detected, wherein the timing device controls the nozzle spray on and spray off cycles when the timing device is turned on.

2. The method of claim 1, further comprising changing at least one of a volume of diluent dispensed through the nozzle, a pressure of diluent, a pulsed diluent spray frequency, and a pulsed diluent spray duration to adjust the concentration of the dissolved solid product in the use solution.

3. The method of claim 1, further comprising utilizing a closed loop control system to control the pulsed diluent.

4. The method of claim 3, wherein the closed loop control system utilizes at least one of a load cell to measure weight loss of the solid product, a conductivity cell to measure the concentration of the dissolved solid product in the use solution, and a refractometer to measure the concentration of the dissolved solid product in the use solution.

5. The method of claim 1, further comprising utilizing an open loop control system to control the pulsed diluent.

6. The method of claim 5, wherein the open loop control system adjusts pulsed spray of diluent based on diluent temperature.

7. The method of claim 5, wherein the open loop control system adjusts pulsed spray of diluent based on ambient temperature.

8. A method of dispensing a solid product, the method comprising:
housing a solid product above a sump that is configured to hold a concentrated solution;
dissolving the solid product to generate the concentrated solution in the sump with a pulsed dilute spray using a spray cycle that directs the pulsed dilute spray on the solid product for a select amount of time that maximizes contact of the dilute spray with the solid product during an on portion of the spray cycle and maximizes a residence time of the dilute spray on the solid product during an off portion of the spray cycle to allow the dilute spray to dissolve a portion of the solid product before a next spray cycle is run so the concentration solution has a high concentration of the dissolved solid product relative to a concentration that would occur with the use of a non-pulsed spray;
detecting a level of the concentrated solution in the sump;
turning off a timing device when a desired level of the concentrated solution is detected; and
turning on the timing device when a lower level than the desired level of the concentrated solution is detected, wherein the timing device controls the spray cycle when the timing device is turned on.

9. The method of claim 8, further comprising:
preventing backflow in a dilute supply line with a vacuum breaker assembly.

10. The method of claim 8, further comprising:
reducing overspray of the dilute spray on the solid product.

11. The method of claim 8, further comprising:
adjusting at least one of pulsed spray frequency and pulsed spray duration of a spray cycle using the timing device to achieve a desired concentration of the dissolved solid product in the concentration solution.

12. The method of claim 8, further comprising:
measuring the concentration of the dissolved solid product in the concentration solution.

13. The method of claim 8, further comprising:
adjusting at least one of pulsed spray frequency and pulsed spray duration of a spray cycle to account for changes in environmental conditions.

14. The method of claim 8, further comprising:
adjusting at least one of pulsed spray frequency and pulsed spray duration of a spray cycle based on at least one of diluent temperature and ambient temperature.

15. The method of claim 8, further comprising:
adjusting at least one of pulsed spray frequency and pulsed spray duration of a spray cycle based at least in part on diluent pressure.

16. The method of claim 8, further comprising:
adjusting at least one of pulsed spray frequency and pulsed spray duration of a spray cycle based at least in part on water hardness of diluent.

17. The method of claim 8, further comprising:
measuring a weight loss of the solid product.

18. A method of dispensing a solid product, the method comprising:
housing a solid product above a sump that is configured to hold a concentrated solution;
dissolving the solid product to generate the concentrated solution in the sump with a pulsed dilute spray using a spray cycle that directs the pulsed dilute spray on the solid product for a select amount of time that maximizes contact of the dilute spray with the solid product during an on portion of the spray cycle and maximizes a residence time of the dilute spray on the solid product during an off portion of the spray cycle to allow the dilute spray to dissolve a portion of the solid product before a next spray cycle is run so the concentration solution has a high concentration of the dissolved solid product relative to a concentration that would occur with the use of a non-pulsed spray;
detecting a level of the concentrated solution in the sump;
turning off a timing device when a desired level of the concentrated solution is detected;
turning on the timing device when a lower level than the desired level of the concentrated solution is detected, wherein the timing device controls the spray cycle and the next spray cycle when the timing device is turned on so as to control the select amount of time;
preventing backflow of the concentrated solution in a diluent supply line; and
selectively dispensing the concentrated solution from the sump.

19. The method of claim 18, wherein the timing device controls the spray cycle such that the on portion of the spray cycle is between 0.1 to 2.0 seconds and the off portion of the spray cycle is between 5 seconds to 5 minutes.

20. The method of claim 18, further comprising:

conveying the concentrated solution from the sump to a mixer and mixing the concentrated solution with a diluent at the mixer to form a use solution.

* * * * *